United States Patent
Kato et al.

(10) Patent No.: US 6,241,879 B1
(45) Date of Patent: *Jun. 5, 2001

(54) FILTERING MACHINE AND FILTER CLOTH THEREFOR

(75) Inventors: Hiroyasu Kato; Manabu Terao, both of Shiga-ken; Yoshihiro Tomida, Osaka, all of (JP)

(73) Assignee: Toray Industries, Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,107

(22) PCT Filed: May 31, 1996

(86) PCT No.: PCT/JP96/01493

§ 371 Date: Feb. 18, 1998

§ 102(e) Date: Feb. 18, 1998

(87) PCT Pub. No.: WO97/45188

PCT Pub. Date: Dec. 4, 1997

(51) Int. Cl.$^7$ .......................... B01D 39/08; B01D 33/044; B01D 33/23; B01D 33/44; B01D 33/80

(52) U.S. Cl. .......................... 210/106; 210/108; 210/138; 210/386; 210/391; 210/392; 210/393; 210/394; 210/396; 210/397; 210/400; 210/401; 210/402; 210/403; 210/496; 210/499; 442/199; 442/200; 442/201; 442/239

(58) Field of Search ...................................... 210/351, 386, 210/391–394, 396–397, 400–403, 434, 496, 499, 106, 108, 138; 442/199, 200, 201, 239

(56) References Cited

U.S. PATENT DOCUMENTS 3,559,810 * 2/1971 Lee et al. .

(List continued on next page.)

FOREIGN PATENT DOCUMENTS

5-022017 * 3/1993 (JP) .
7-5178 * 1/1995 (JP) .

*Primary Examiner*—Matthew O. Savage
*Assistant Examiner*—Michael A. Fleming
(74) *Attorney, Agent, or Firm*—Austin R. Miller (57) ABSTRACT

A filter cloth comprising at least a base layer and a filtering layer, characterized in that the ratio T/L of the thickness (T) of the filtering layer to the length (L) of fibers of fiber bundles constituting the filtering layer is 0.02 to 0.7 and the sum of a projected area of the fibers onto the base layer surface is 8 to 350 times the area of the base layer surface and, a filter cloth characterized in being constituted with at least a base layer and a filtering layer mainly composed of fiber bundles of crimped fiber ratio over 5%. Again, a belt type solid-liquid separating machine characterized in being constituted with at least a mechanism in which the filter cloth of this invention is provided on a plurality of rollers and is moved therearound, a mechanism for supplying unfiltered water onto an inclined belt, a mechanism for sucking supplied unfiltered water from the rear surface of the belt, a mechanism for dewatering a cake formed on the belt by pressurizing the same, a mechanism for peeling off the dewatered cake and a mechanism for washing the belt. In addition, a filtering machine characterized in being constituted with at least a mechanism for partitioning inside and outside portions by providing the filter cloth of this invention around a drum or a disc-like structural member, a mechanism for passing water through the filter cloth by supplying unfiltered water to the partitioned outside or inside portion, a mechanism for washing the filter cloth from the unfiltered water supply side and/or the other side and a mechanism for discharging concentrated water produced by the washing.

45 Claims, 4 Drawing Sheets

U.S. PATENT DOCUMENTS

| | | | |
|---|---|---|---|
| 3,658,099 | * | 4/1972 | Daringer . |
| 3,706,378 | * | 12/1972 | Markwick ............................ 210/107 |
| 4,284,507 | * | 8/1981 | Beane . |
| 4,439,320 | * | 3/1984 | Blok ................................... 210/394 |
| 4,707,260 | * | 11/1987 | Nagayama et al. . |
| 4,869,823 | * | 9/1989 | Otani et al. . |
| 5,368,925 | * | 11/1994 | Hosokawa et al. .................. 442/359 |
| 5,571,404 | * | 11/1996 | Derenthal . |
| 5,615,713 | * | 4/1997 | Benesi . |
| 5,624,579 | * | 4/1997 | Bratten . |

* cited by examiner

FILTERING MACHINE AND FILTER CLOTH THEREFOR

DESCRIPTION

1. Technical Field

This invention relates to a filter cloth having a base layer constituting a base cloth and a filtering layer consisting of fiber bundles having root portions in the base layer. The invention also relates to a filter cloth wherein the filtering layer is mainly composed of fiber bundles having a specified crimped fiber ratio. More particularly, the invention relates to a new filter cloth having excellent fine particle collecting performance, washing recovery performance, dimension stability, excellent in durability and excellent in water permeability, which can be preferably used for suspended material separation. The invention also relates to a belt type solid-liquid separating machine and a filtering machine in which this filter cloth is used.

2. Background Art

As filters for filtering fine particles included in gases such as air or liquids such as water or solvents, filter cloths made of woven and nonwoven fabrics in which fibers are used have been widely employed. In particular, for filtering suspended solid in water, woven fabrics of lattice structure based on the so-called 3 motive design, plain, twill and satin, have been used. In addition, for example in Japanese Patent Publication No. S62-13046 and Japanese Patent Publication No. H2-47244, filter cloths made by raising a woven fabric wherein an ultra fine fiber is used for the weft and thereby forming naps of ultra fine fiber on the surface are disclosed. In addition, as filters having fiber bundles on a surface, filters and filter cloths disclosed in Japanese Utility Model Publication No. H2-36568, Japanese Utility Model Publication No. H5-34730 and Japanese Unexamined Utility Model Publication No. H4-14112 are known. In Japanese Utility Model Publication No. H6-27672 and Japanese Utility Model Publication No. H6-30874, pile woven and knit fabrics having piles wherein crimped threads and uncrimped multifilaments are woven together are disclosed. In Japanese Patent Publication No. H1-40136 and Japanese Unexamined Patent Publication No. S58-120834, textiles made by raising woven fabrics wherein false twisted thread is used for the weft are disclosed.

However, because conventional filter cloths made of woven or knit fabrics using fibers pass unfiltered water through gaps in a lattice structure of fibers and catch particles contained in the unfiltered water in the lattice, particles smaller than the size of the gaps in the lattice are hardly caught and pass through. There have been filter cloths wherein to catch particles of small particle diameter the weaving density is increased and the size of the lattice is thereby made small, but with these the ratio of gaps in the filter cloth becomes small and the permeated water that can be filtered falls severely, and also fouling soon occurs and filtering becomes impossible. There have also been filter cloths wherein the threads or fibers constituting the woven fabric are made thin with the aim of increasing the small particle collecting performance, but with these there has been the problem that particles once lodged in the gaps between the fibers are not easy to wash off even by carrying out backwashing or the like and fouling has soon occurred. In addition, because the threads or fibers are thin, the strength of the cloth has been low and its durability has been low. With filter cloths of knit structures, on the other hand, the elongation of the knit fabric has been great and the dimensional stability has been inferior. In addition, there has been the problem that because the filter cloth deforms easily and as a result the gaps change greatly the particle diameter of fine particles which can be rejected varies and it is difficult to obtain stable filtering performance. With filter cloths of nonwoven structures, because they are three-dimensional structures of fibers and are relatively thick and dense, the particle collecting performance is good but pressure loss is high and also, because it is difficult to remove particles once caught in the three-dimensional lattice, recovery of the filtering cloths is problematical and they are inferior in reusability. In addition, because they deform easily when a tension acts on them, they are inferior in dimensional stability. In the filter cloths disclosed in Japanese Patent Publication No. S62-13046 and Japanese Patent Publication No. H2-47244, because the length of the naps is short and the quantity of the naps is also small there has been a limit on the fine particle rejecting performance. In addition, because surface layer parts of ultra fine fiber bundles constituting the weft have fibers pulled out into a loop form, fine particles are trapped by these parts and fouling tends to occur, and because once fine particles have become lodged it is difficult to remove them the performance recovery obtained by washing and the like has been inferior. Even when the number of raising operations is increased, because there is a limit on the increase in number of naps this has not been an effective means for increasing fine particle rejecting performance. Conversely, because together with increases in the number of raising operations cutting of the fibers constituting the weft occurs everywhere, the strength of the weft falls, tears occur in the warp direction of the filter cloth after a short period of use and it has only been possible to obtain filter cloths having low durability. In the filter cloths disclosed in Japanese Utility Model Publication No. H2-36568, when a base cloth and a pile are bound by setting with resin, the resin has tended to seep to the upper part of the pile and form adhered unevenness, and it has been difficult to control the application of the resin uniformly. As a result, areas of fiber bundles bound and set by resin having seeped to their upper parts become holes and because fine particle collecting cannot be performed in these areas and as filter cloths they have inevitably only been applicable to collecting particles of large particle diameter. In addition, because they are for filters for air cleaners, it has not been possible to use them for filtering liquids at all. The filter cloth disclosed in Japanese Utility Model Publication No. H5-34730 is a filter cloth wherein pile ends are bent and parted, but because to prevent pile laying down the use of a considerably thickly woven fiber of several tens of denier is necessary and because there are many gaps between the piles, the dust-collecting efficiency of particles of small particle diameter has been low. In addition, because it is a dust-collecting filter cloth for air cleaning, it has not been possible to use it for filtering liquids at all. In the filter cloth disclosed in Japanese Unexamined Utility Model Publication No. H4-14112, because standing fiber stand substantially vertically with respect to a knit base, the rate at which passing through of particles can be rejected by the fibers themselves is low and due to particles entering between the fibers standing vertically together fouling has tended to occur at an early stage of filtering. When the particle diameter is small as compared with the size of the loops of the knit base there has been the problem that because particles having entered between standing fiber are not caught in the mesh of the knit base either and pass through the loops the fine particle rejecting performance is low. In addition, when during filtering the standing fibers lie down, because the directions of the lying down are diverse and the knit base is exposed in various places, there has been a limit to an increase in rejecting performance.

The pile woven and knit fabrics disclosed in Japanese Utility Model Publication No. H6-27672 and Japanese Utility Model Publication No. H6-30874 are fabrics for clothing and for seat coverings superior in quality and luster of which the piles stand close vertically and do not perform as filter cloths at all. In Japanese Patent Publication No. H1-40136 and Japanese Unexamined Patent Publication No. S58-120834, weaving methods using false twisted wefts are disclosed, but since these are raised woven fabrics wherein individual naps are independent they are completely different from the filter cloth of the present invention and also these raised woven fabrics are chiefly for use in clothing and have not been applicable to filter cloths.

DISCLOSURE OF INVENTION

An object of this invention is to solve the above-mentioned problems associated with conventional filter cloths and provide a new filter cloth having excellent fine particle collecting performance, washing recovery performance and durability, and another object is to provide a new filter cloth whose fine particle rejection in filtering liquids is high and having high water permeability and anti-fouling durability, superior dimension stability and long life which can be preferably used for suspended solid separation. A further object of the invention is to provide a belt type solid-liquid separating machine and a filtering machine fitted with this filter cloth having excellent fine particle rejecting performance, washing recovery performance, durability, filter cloth belt transport stability and filtering process stability and having the feature that the conflicting characteristics of fine particle rejection and water permeability are both obtained at a high level.

The objects of the invention are basically achieved by the following constructions:

'A filter cloth comprising at least a base layer and a filtering layer, wherein the ratio T/L of the thickness (T) of the filtering layer to the length (L) of fibers of fiber bundles constituting the filtering layer is 0.02 to 0.7 and the total projected area onto the base layer surface of the fibers is 8 to 350 times the area of the base layer surface.'; 'A filter cloth comprising at least a base layer and a filtering layer mainly composed of fiber bundles of crimped fiber ratio over 5%.'; 'A belt type solid-liquid separating machine comprising at least a mechanism having fitted on a plurality of rollers and transporting a belt in which is used a filter cloth mentioned above, a mechanism for supplying unfiltered water onto an inclined part of the belt, a mechanism for sucking supplied unfiltered water from the rear side of the belt, a mechanism for pressurizing and dewatering a cake formed on the belt, a mechanism for peeling off the dewatered cake and a mechanism for washing the belt.'; and 'A filtering machine comprising at least a mechanism having a filter cloth mentioned above fitted to a drum or a disc-like structural member and partitioning an inside part and an outside part, a mechanism for supplying unfiltered water to the partitioned outside part or inside part and causing the unfiltered water to pass through the filter cloth, a mechanism for washing the filter cloth from the unfiltered water supply side and/or the other side of the filter cloth, and a mechanism for discharging concentrated water produced by the washing.'

BRIEF DESCRIPTION OF DRAWINGS

FIG. 5 is a view illustrating fiber bundles constituting a filtering layer intertwined at root portions thereof with a weft and/or warp of a base layer in at least three places.

EXPLANATION OF THE REFERENCE NUMERALS

| 1: | upper filtering pipe | 2: | filter cloth |
|---|---|---|---|
| 3: | metal gauze | 4: | measuring cylinder |
| 5: | pump | 6: | distilled water |
| 7: | clamp | 8: | cock |
| 9: | lower filtering pipe | 10: | filter cloth |
| 11: | unfiltered water | 12: | unfiltered water tank |
| 12a: | frame | 13: | mirror finished transfer roller |
| 13a: | press roller | 13b: | rotating roller |
| 14: | cake | 15: | surface washing spray |
| 16: | washing discharge hole | 17: | backwashing spray |
| 18: | pressure-reducing blower | 19: | scraper |
| 20: | filtered water | 21: | filter cloth |
| 22: | unfiltered water | 23: | filtered water |
| 24: | concentrated water | 24a: | concentrated water tray |
| 25: | washing water pump | 26: | backwashing spray |
| 27: | surface washing spray | 28: | rotary drum |
| 29: | loss water head | 30: | fiber |
| 31: | straight line ab | 32: | straight line cd |
| 33: | crossing point | | |

BEST MODES FOR CARRYING OUT THE INVENTION

Fibers which can be used in fiber bundles constituting a filtering layer of the invention are made of polymer substances having fiber formability, and examples thereof include polyamides and aromatic polyamides such as nylon 6, nylon 66, nylon 12 and copolymers of polyamides, polyesters such as polyethylene terephthalate, copolymers of polyethylene terephthalate, polybutylene terephthalate and copolymers polybutylene terephthalate, polyolefins such as all-aromatic polyesters, polyethylene and polypropylene, and polyurethane, polyacrylonitrile, polyvinyl chloride, polyvinyl alcohol, vinyl polymers, polyvinylidene chloride, polyhydrosulfite, polyethylene fluoride, copolymers of polyethylene fluoride and polyoxymethylene. Composite fibers and combinations of different types of fiber of core and sheath structure, multiple core and sheath structure, islands in the sea structure or bimetal structure or the like made by combining a plurality of these polymer substances are used according to the application.

As the thickness of the fiber, a relatively thin two denier or less is preferable, but to increase fine particle collecting performance 0.001 to 1 denier is more preferable and to increase fine particle collecting performance while keeping the durability of the fiber high 0.03 to 0.5 denier is still more preferable.

A fiber bundle of this invention is made by arranging multiple fibers of different kinds or of the same kind arranged together in the form of a bundle. Preferably, at least one end of each fiber bundle constituting a filtering layer is a free end, and the other end or a middle portion of the fiber bundle is integrated with the base layer. Free end refers to a state wherein the end of the fiber is released and can move freely. Preferably, the fiber bundle flares from its root portion toward its end and is bent and inclined in a predetermined direction such as the length direction or the width direction of the filter cloth.

An end portion of the fiber bundle or a middle portion of the fiber bundle and the base layer are integrated by intertwining with threads of the base layer, adhesion with an adhesive, thermal fusion, ultrasonic adhesion or a combination of these. A filter cloth of a structure wherein the structure of the base layer is woven and root portions of the fiber bundles of the filtering layer are mutually intertwined with the weft and/or the warp of the base layer in at least three places is preferable because the fiber bundles do not readily come off during use. The integrated portions are preferably arranged on the base layer surface regularly, but even when they are not arranged regularly, preferably there are no areas where the fiber bundles are sparse or areas where there are no fiber bundles, which areas have an effect on the filtering performance, and the integrated portions are disposed so as to be positioned uniformly over the base layer surface.

To achieve the objects of the invention it is necessary that when the average length from where the fiber bundles are fixed integrally with the base layer, i.e. the highest surface position of the base layer, of the fiber bundle fibers thereon is written L (mm) and the thickness of the filtering layer is written T(mm), T/L is 0.02 to 0.7. When T/L is less than 0.02 the fine particle collecting performance is low and it is not possible to hold many fine particles in the filtering layer, or the filtering layer is too dense and soon clogs easily, and therefore this is not preferable. When it is greater than 0.7, because fine particles are hardly filtered in the surface part of the filtering layer and readily enter the inside of the filtering layer and pass straight through without being blocked it is not possible to obtain a high rejection and therefore this is not preferable. In addition, when it is greater than 0.7 and the base layer has a dense structure, fine particles having entered the inside accumulate and cause fouling, and even when washing is carried out fine particles having entered the inside are difficult to wash off and the washing recovery performance is poor and therefore this is not preferable. Preferable as a value of T/L is 0.02 to 0.6, and more preferable is 0.02 to 0.5. When the fiber of the filtering layer is 0.5 denier or less, 0.02 to 0.25 is particularly preferable.

It is necessary that when all the fibers of a filtering layer in the invention are lined up on a plane, the sum of the projected areas of the individual fibers on the plane is 8 to 350 times the corresponding area of the filter cloth.

When it is smaller than 8 times this, because covering of the base layer surface by the fibers is insufficient and collecting of particles is not carried out satisfactorily, the rejection is low, and, because the quantity of particles held in the filtering layer is small, there has been the problem that once fouling starts to occur a rise in filtering pressure rapidly occurs. In addition, when on the other hand it is greater than 350 times, the quantity of fibers in the filtering layer is too great, the water permeability falls severely, the amount which can be processed decreases and efficient processing is not possible. From 10 to 250 times, more favorable results can be obtained through balancing of a high rejection and a high water permeability.

In addition, in the invention, to catch particularly small particles, it is necessary that the filtering layer be mainly made of fiber bundles whose crimped fiber ratio is 5% or more. When the crimped fiber ratio is lower than 5%, fibers constituting the fiber bundles easily converge with each other, the surface of the filter cloth is not sufficiently covered by fibers, gaps form between fiber bundles and particle collecting is not satisfactory. When on the other hand the crimped fiber ratio is excessively high, entangling of fibers with each other becomes too strong, the fiber bundles become bundle-like aggregates, covering of the surface of the filter cloth by fibers again becomes insufficient and, depending on the conditions, cases of the particle collecting performance falling may occur. To reduce poor fiber bundle flaring caused by converging and entangling of fibers and to form suitable spaces between fibers and thereby raise particle collecting performance a crimped fiber ratio of 10 to 95% is preferable, and more preferable results can be obtained with a crimped fiber ratio of 15 to 90%.

In addition, the filtering layer is preferably mainly made of fiber bundles of at least two types between which there is a difference in crimped fiber ratio of 10% or more. As forms wherein there is a difference in crimped fiber ratio there are: [1] cases wherein one bundle is made of two types of fiber and a difference is provided in the crimped fiber ratios of these two types of fiber, [2] cases wherein a difference in crimped fiber ratio is provided between fiber bundles and [3] cases of both of these, and an optimum form is selected according to the application and the required performance. When fine particles are to be caught, form [1] is suitable. When relatively large particles whose average particle diameter exceeds 25 μm are to be caught, forms [2] and [3] are preferable. When the crimped fiber ratio difference is smaller than 10%, the effect of providing the difference in crimped fiber ratio does not readily appear. As at least two types of fiber bundle between which there is a difference in crimped fiber ratio of 10% or more, a case wherein the crimped fiber ratios of at least two types of fiber bundles are over 5% is preferable, but a combination wherein the crimped fiber ratio of at least one type of fiber bundle is less than 5% can also be employed in a limited range.

To impart this crimped fiber ratio, it can be achieved easily by means of a false thread-twisting process. There is no particular limitation on the process, but for example, as a false thread-twisting process, using an intersecting belt type twister, with conditions of thread speed 300 m/min, heating plate temperature stage one 210° C., stage two 190° C., twister intersecting angle 110° and belt/thread speed ratio 1.39, for example when the false twisting draw ratio is adjusted to 1.005 and the reset overfeed rate is adjusted to 5%, a false twisted thread of crimped fiber ratio 55.7% can be obtained.

Alternatively, to achieve the objects of the invention, the filtering layer is preferably mainly made of fiber bundles whose percentage crimp is 2 to 45%, a percentage crimp of 2 to 35% is more preferable and a percentage crimp of 2 to 25% is still more preferable. For example, when the percentage crimp is 3.2%, a crimped fiber ratio of 55.7% can be obtained. Percentage crimp is defined below under the heading 'Definitions of the Parameters'.

The number of fiber bundles in the base layer surface should be made such that the particle collecting performance does not deteriorate because the number of stumps is too low and the gaps between the stumps are too large and the parts of the base layer where these gaps occur cannot be fully covered. In addition, conversely, when the number of stumps is too great the gaps between the stumps are too narrow, the gas and liquid passing resistance increases and pressure losses become high and the amount which can be processed also decreases. In addition, particles having entered between fiber bundles and inside fiber bundles become difficult to remove and the recovery performance of the filter cloth falls.

Therefore, the frequency of appearance of fiber bundles at the base layer surface is preferably 40 to 900 stumps/cm². More preferable results can be obtained when it is 50 to 500 stumps/cm².

The total denier of fiber bundles per one stump of the filtering layer, like the density of fiber bundles, should also be made such that gap parts of the base layer can be covered, and on the other hand attention should be paid to ensuring that the passing resistance does not increase and pressure losses do not become high because the fiber bundles are too thick and the gaps between stumps are too narrow. The total denier of fiber bundles per filtering layer stump can be changed according to the target performance and purpose of use of the filter cloth and the thickness of the fibers used in the fiber bundles, but 50 to 1500 denier is preferable. When the fiber used for the fiber bundles is thicker than 2 denier 50 to 750 is more preferable, and when the fiber used for the fiber bundles is less than 1 denier 100 to 1500 denier is more preferable. Preferably also, a composite fiber is used for the fiber bundles of the filtering layer and made into an ultra fine fiber by some components being removed by being dissolved or being separated in the manufacturing process. In this case, because the size of an ordinary composite fiber is thicker than 2 denier, the fiber bundle is preferably less than 750 denier so that work in the manufacturing process is easy. In addition, the number of fibers per stump is a value determined by the total denier of the fiber bundles and the thickness of the fibers used in the fiber bundles, but 50 to 15000 fibers/stump is preferable and 150 to 15000 fibers/stump is more preferable. With ultra fine fibers under 0.5 denier 300 to 15000 fibers/stump and with ultra fine fibers under 0.2 denier 500 to 15000 fibers/stump is particularly preferable.

When the length of the fibers of the filtering layer becomes too short, because the quantity of fibers which can contribute to filtering becomes small, the particle collecting performance falls. In addition, because the fibers become difficult to bend and the end portions of the fibers tend to stand vertically together on the surface of the filtering layer, particles accumulate between the fibers standing vertically together and tend to cause fouling, and the washing recovery performance also falls. When on the other hand the length of the fibers of the filtering layer becomes too long, the particle collecting performance is good but the gas and liquid passing resistance becomes high and the amount which can be processed also decreases. In addition, during filtering, fibers entangle with each other and tend to form nep-shaped lumps. For these reasons, the length of the fibers of the filtering layer is preferably 2 mm to 20 mm. When it is 2 mm to 15 mm, more preferable results can be obtained. The fiber length referred to here is the average length of the fiber bundle fibers from where the fiber bundles are fixed integrally with the base layer, i.e. the highest surface position of the base layer, to the free ends.

To avoid the filter cloth greatly deforming when a strong tension acts thereon, the percentage elongation in the length direction and the width direction is preferably below 10%. The percentage elongation referred to here is measured under standard conditions by marking a strip-shaped test piece of width 3 cm with a 20 cm spacing, applying a load of 12 kgf to the test piece in the length direction thereof, applying a load of 6 kgf to the test piece in the width direction thereof and measuring the length between the markings after 90 minutes. The percentage elongation at this time is obtained using the following equation:

$$\text{percentage elongation} = (b-a) \div a \times 100 \, (\%)$$

Here, a is the length between the markings when an initial load of 100 gf was applied to the test piece and b is the length between the markings, with the loads still applied, 90 minutes after the loads were applied. To avoid the meshes of the base layer from expanding and the filtering performance consequently falling, a percentage elongation in the warp direction of less than 8% is more preferable and less than 6% is still more preferable. A value of percentage elongation in the width direction slightly higher as compared with the length direction is tolerable; but nevertheless preferably less than 9% is good and less than 7% is more preferable.

To avoid the filter cloth greatly deforming and to obtain a filter cloth having excellent dimensional stability, using as the fiber of the base layer mainly a fiber whose initial tensile modulus measured by the method of JIS L1013 is over 250 kgf/mm², preferably over 300 kgf/mm² and more preferably over 350 kgf/mm² is recommended. In addition, as the form of the fiber, a fiber of a straight form which does not extend easily is preferable to a fiber crimped and having an easily extending structure such as a false twisted thread. Furthermore, to produce a filter cloth excelling in dimensional stability, the structure of the base layer is preferably woven. In actual filtering, when filtering is carried out by a filter cloth alone without a wire gauze or a porous plate being disposed downstream of the filter cloth, with a knit or nonwoven filter cloth the filter cloth readily deforms under weak tensions by swelling and extending out of shape. In addition, the apparent density of the filter cloth is preferably 0.15 to 0.6 gf/cm³. The apparent density (gf/cm³) of the filter cloth is obtained by dividing the weight(gf/m²) per 1 square meter of the filter cloth, by the thickness T1 of the filter cloth obtained by a measuring method set forth in parameter definition (2), which will be further discussed later, and matching the units. When the apparent density is too low the fine particle collecting performance is not satisfactory and when it is too high the water permeability becomes inadequate. To balance the fine particle collecting performance and the water permeability, the apparent density of the filter cloth is preferably 0.2 to 0.6 gf/cm³. An apparent density of 0.25 to 0.5 gf/cm³ is more preferable.

Figure 2:
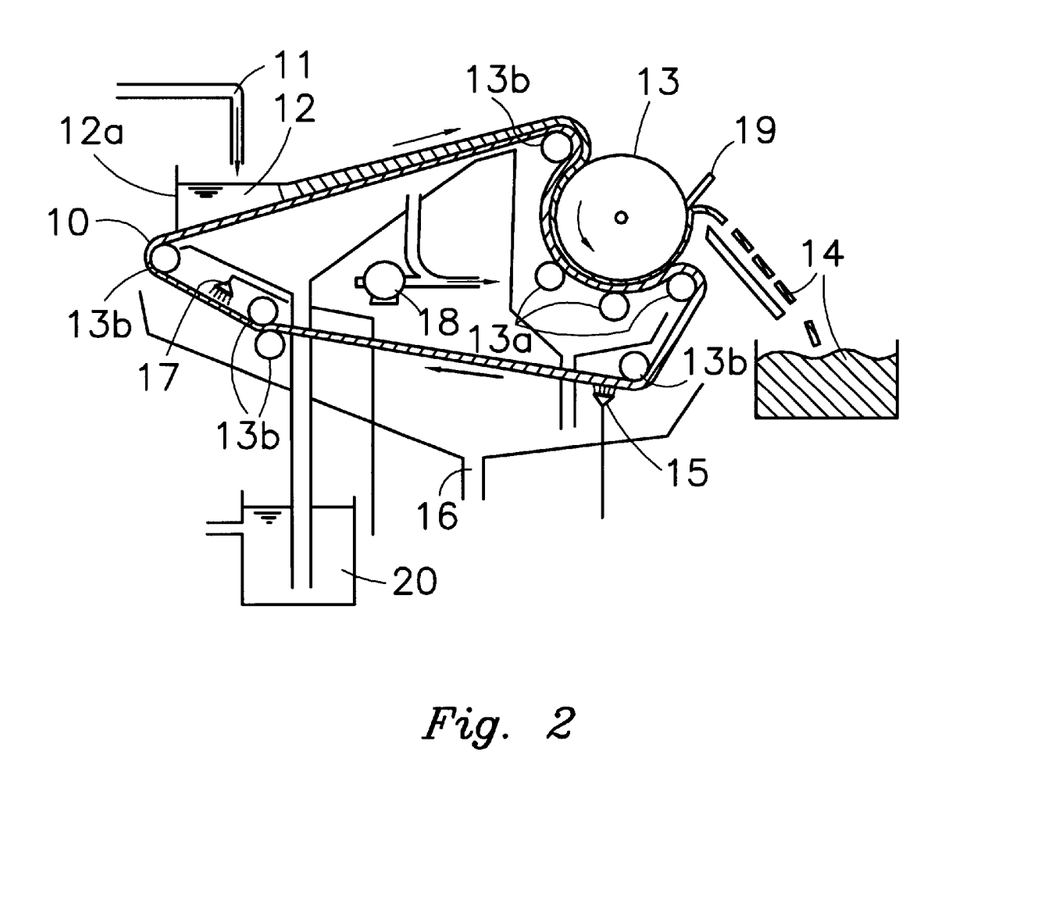
FIG. 2 is a side view showing a filtering mechanism of a belt type solid-liquid separating machine.

When separating suspended solid, with respect to unfiltered water whose suspended solid concentration is over a few hundred ppm, for example as shown in FIG. 2, a belt type solid-liquid separating machine of a structure wherein a belt made using a filter cloth of the invention is transported to carry out separation of suspended solid in unfiltered water has excellent performance characteristics such as that the transport stability of the belt is high, it is possible to catch fine particles efficiently and the durability is high.

This solid-liquid separating machine will now be described in further detail on the basis of FIG. 2, but the invention is in no way limited by this.

That is, an endless belt 10 is made using a filter cloth of the invention. In this belt 10, as the material thereof just a filter cloth of the invention may be used, but alternatively a intensifying material may be disposed along the sides of the belt to reinforce its strength, a material of low water permeability may be laid to prevent water leakage from the sides or a belt with holes may be attached and the belt guided by sprockets on the machine side to increase dimension stability.

This belt 10 is fitted to a plurality of rollers (13a, 13b) and transported in the direction of the arrows, and unfiltered water 11 is supplied to a unfiltered water tank 12 above an inclined part of the belt. The unfiltered water tank 12 is surrounded by a frame 12a and can hold unfiltered water. The travelling belt 10 forms the bottom of the unfiltered water tank 12. Filtered water 20 having passed through the belt 10 is obtained, but at this time a mechanism for sucking supplied unfiltered water from the rear surface of the belt, for example a pressure-reducing blower 18, is preferably used. A cake 14 formed on the belt is pressed and dewatered by a mirror finished transfer roller 13 and press rollers 13*a*. The cake 14 is transferred to the surface of the mirror finished transfer roller 13 and scraped off by a scraper 19 and collected. In this case, the side with the filtering layer is made to face the surface of the mirror finished transfer roller 13. In addition, the fibers of the filtering layer are preferably set so that they lie in the opposite direction to the transport direction of the belt, i.e. toward the rear.

A belt type solid-liquid separating machine of this construction has excellent washing recovery performance and filter cloth processing stability and has the feature that the conflicting characteristics of suspended solid collecting performance and the amount which can be processed are both obtained at a high level.

In addition, with a belt type solid-liquid separating machine having a function whereby the position of the belt is detected by detecting devices such as infrared or laser optical sensors or contact type sensors and when the position of the belt has deviated greatly during transport an output signal is transmitted to a mechanism for correcting meandering of the belt and the belt is returned to its correct position, belt transport stability of a higher level can be obtained and unmanned operation over a long period is possible. In addition, with a belt type solid-liquid separating machine having a mechanism for detecting a degree of pressure drop for sucking from the rear surface of the belt and a mechanism for starting washing of the filter cloth by spraying spray water or intensifying washing by raising the spray pressure when this degree of pressure drop exceeds a predetermined value and a mechanism for stopping washing of the filter cloth or returning it to a normal condition after a predetermined time has elapsed since washing of the filter cloth was started or intensified it is possible, for gradually progressing fouling of the filter cloth, to recover automatically from this and stable operation over a longer time is possible. In addition, water for washing can be saved and operation at a low running cost becomes possible. In this belt type solid-liquid separating machine, better performance can be obtained by the filter cloth being fitted so that the filtering layer is on the unfiltered water supply side. By a combination of the mechanisms described above and a filter cloth of the invention, this superior performance is achieved for the first time ever.

Figure 3:
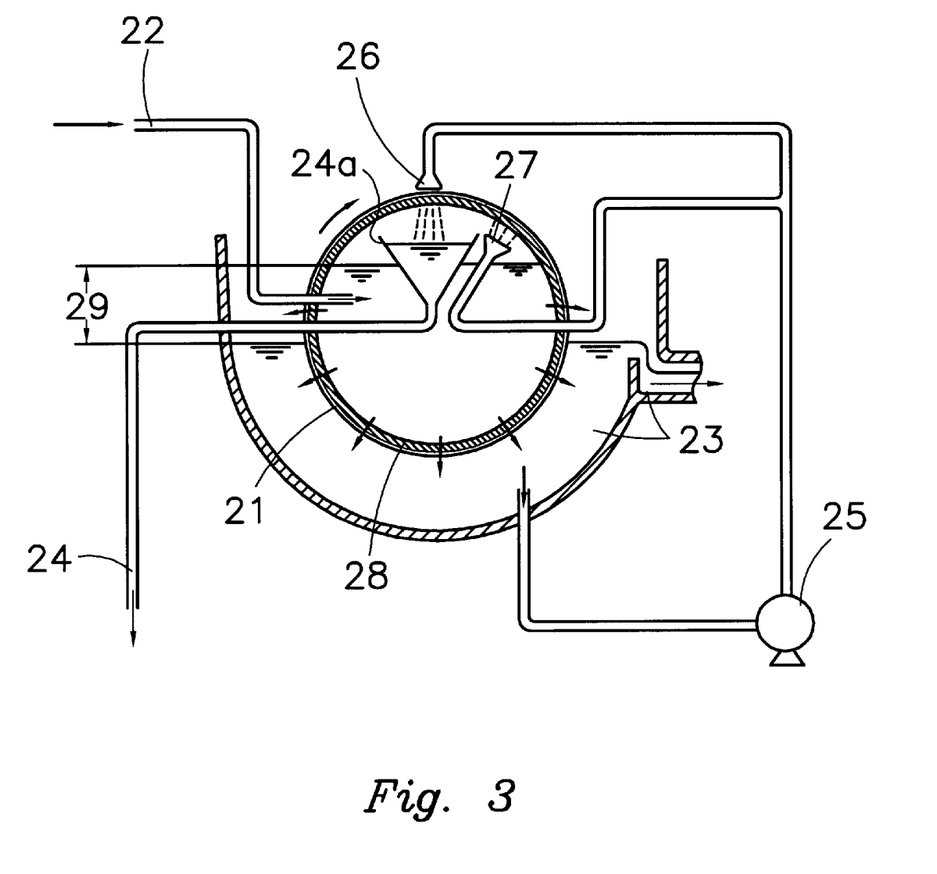
FIG. 3 is a side view showing a mechanism of a rotary drum type continuous filtering machine.

With respect to unfiltered water whose suspended solid concentration is a relatively low concentration of less than a few hundred ppm, for example as shown in FIG. 3, a filtering machine having a structure wherein a filter cloth of the invention is fitted to a rotating drum or a flat plate and unfiltered water is passed through the filter cloth to carry out separation of suspended solid has superior fine particle collecting performance and washing recovery performance and has the excellent performance characteristic that water permeability and fine particle collecting performance are both obtained at a high level.

This solid-liquid separating machine will now be described in further detail on the basis of FIG. 3, but the invention is in no way limited by this.

That is, a filter cloth 21 of the invention is fitted around a drum or disc-like structural member such as a rotary drum 28 rotating in the direction of the arrows so as to partition an inside and an outside thereof. The filter cloth is supported by a plurality of intensifying ribs extending for example in the width direction along the periphery of the rotary drum, i.e. the surface on which the filter cloth 21 is fitted, and water being filtered passes through gaps between the ribs. In the case shown in FIG. 3, unfiltered water 22 is supplied to the partitioned inside and then passed through the filter cloth, but a method wherein, in reverse, it is supplied from outside and passed through to the inside may alternatively be used. In particular, by employing a construction wherein a backwashing spray 26 and a concentrated water tray 24*a* are disposed so as to face each other, unfiltered water and concentrated water do not mix and efficiency is good. As a mechanism for washing the filter cloth, there may be provided either a mechanism such as a surface washing spray 27 which washes from the unfiltered water supply side or a mechanism such as the backwashing spray 26 which washes from the filtered water delivery side, or both may be provided. In this mechanism unfiltered water inside the drum is caused to be filtered by the filter cloth by a pressure difference of a loss water head 29 and filtered water 23 is thereby obtained, but when necessary the unfiltered water side may be pressurized to raise the filtering speed. In FIG. 3, pipes of the unfiltered water 22, the concentrated water 24 and the surface washing spray 27 are shown crossing the periphery of the drum on which the filter cloth is disposed, but in practice these pipes enter the inside of the drum for example through axial centers of the side faces of the drum. With a filtering machine of this construction it is not necessary to temporarily stop the filtering process to perform backwashing and therefore filtering processing can be carried out continuously, and the filtering machine has a hitherto unachievable superior filtering performance based on a synergistic effect of this and the superior fine particle rejection, dimension stability, washing recovery performance and high water permeability of the filter cloth of the invention. Higher performance is obtained by fitting a filtering cloth of the invention so that the filtering layer is on the unfiltered water supply side. In addition, by adopting a construction wherein a drum or disc-like structural member can be rotated it is possible to continuously repeatedly carry out filtering, washing of the filter cloth and recovery of suspended solid concentrated liquid and this is therefore preferable. By making washing of the filter cloth blast-flow washing using a spray, washing can be carried out efficiently with a small quantity of water. Adopting a mechanism causing pressurized liquid to flow in the opposite direction to the flow of the unfiltered water for washing of the filter cloth also is a preferable method for removing suspended solid accumulated on the surface of the filter cloth. In addition, with a filtering machine having a mechanism for detecting the water surface position by means of an electrode rod, an optical sensor or a float or the like or detecting the water depth by means of a pressure gauge or a pressure sensor or the like and thereby detecting the passing resistance (pressure loss) of when the unfiltered water passes through the filter cloth, a mechanism for starting or intensifying washing of the filter cloth when the passing resistance exceeds a preset value and a mechanism for stopping washing of the filter cloth or returning it to a normal condition after a fixed time has elapsed since washing of the filter cloth was started or intensified it is possible to increase washing of the filter cloth and thereby increase the amount processed and prevent unfiltered water from overflowing at times when the concentration of suspended solid in the unfiltered water has suddenly changed and become high or when the flowrate of unfiltered water has suddenly increased and fouling of the filter cloth has consequently progressed rapidly. It is also possible to conduct unmanned automatic operation for long periods. Furthermore, a filtering machine wherein the unfiltered water supply side is of a structure sealed except for a unfiltered water supply opening thereby provides a mechanism for pressurizing and supplying unfiltered water thereby having a mechanism which can pressurize unfiltered water to a high pressure greater than the passing resistance of the unfiltered water with respect to the filter cloth can be effectively used to raise the amount of water processed. In addition, even when using a filter cloth having a high fine particle rejection but a low water permeability coefficient, a high amount of water processed can be obtained and collecting of more minute fine particles can be efficiently achieved.

EXAMPLES

The examples shown below are for making the invention clear, and the invention is not limited to these.

Examples 1 to 6, Comparative Examples 1 to 4

A fabric was made using as a base layer thread a 150 denier, 48 filament thread (F1) made of polyethylene terephthalate for the warp and the weft, and a double fabric consisting of upper and lower sheets of fabric was made using as fiber bundles of a filtering layer a 240 denier, 576 filament thread (F2) made of polyethylene terephthalate. This fabric is a double fabric comprising fiber bundles of a filtering layer extending back and forth repeatedly between upper and lower sheets of fabric separated by a designated space. The F2 fiber bundles have points mutually intertwining with the wefts of the upper and lower fabrics and integrating the two. By slicing the integrated fabric obtained in parallel with the surfaces of the fabric at a designated position in the thickness direction, a number of fabrics having different lengths of filtering layer fibers were obtained. Next, the fiber bundles were flared by the fiber bundle sides of these fabrics being brought into contact with the surface of a rotary brush roller having fine irregularities whereby the fibers were made to spread out all over the surface of the filtering layer and simultaneously aligned in the same direction. Then, the fiber bundles were fixed in this state by the fabrics being passed between a heated smooth metal roller and a rubber roller with the fiber bundle side in contact with the surface of the metal roller. At this time, the clearance between the rollers was changed according to standards of the fabrics and filter cloths obtained in this way having different filtering layer thicknesses were made. The filtering performances of a number of filter cloths having different T/L ratios and multiplying factors of the projected area of the filtering layer fiber bundle fibers with respect to the base layer area were evaluated. The evaluations were, as shown in FIG. 2, carried out using a belt type solid-liquid separating machine having a mechanism which effects filtering by sucking unfiltered water introduced onto a filter cloth travelling as endless belt from the back side and transferred a cake formed on the filter cloth onto a mirror finished roller and collected. In the evaluations, a surplus sludge of an activated sludge process containing 5320 mg/liter of suspended solid of average particle diameter 17.5 $\mu$m was used as the unfiltered water. The results obtained were as shown in Table 1.

From this it can be seen that with the filter cloths of the invention the rejection of suspended solid in the discharged water and the initial water permeability coefficient are high and the time until the limit water permeability coefficient is reached is also long. In Comparative example 1, on the other hand, which has a small value of T/L, the rejection and the water permeability coefficient are both low and the time to the limit water permeability coefficient is also short. With the filter cloth of Comparative example 2, wherein T/L is too high, the water permeability coefficient is high and the time to the limit water permeability coefficient is also long, but the rejection is particularly low. With Comparative example 3, because T/L and the projected area ratio are too high, the water permeability coefficient is particularly low and the time to the limit water permeability coefficient is also particularly short. In Comparative example 4, because T/L is too low, although the rejection is high the water permeability coefficient is extremely low and the time taken to reach the limit water permeability coefficient is also extremely low.

Examples 7 to 14, Comparative Examples 5 to 7

A fabric was made using as a base layer thread (F3) a 250 denier, 48 filament thread made of polyethylene terephthalate for the warp and the weft, and a double fabric consisting of upper and lower sheets of fabric was made using as fiber bundles (F4) of a filtering layer a number of false twisted threads having different percentage crimp made by carrying out false thread-twisting on a 300 denier, 720 filament thread made of polyethylene terephthalate.

This fabric is a double fabric comprising F4 extending back and forth repeatedly between upper and lower sheets of fabric separated by a predetermined space. The F4 fiber bundles have points mutually intertwining with the wefts of the upper and lower fabrics and integrating the two. By slicing the integrated double fabric obtained in parallel with the surfaces of the fabric at a designated position in the thickness direction, fabrics of which the surface of the filtering layer is free ends of fiber bundles were obtained. Next, these fabrics were passed between a rotating brush roller and a back roller whereby the fiber bundles were brushed and flared and the fibers were made to spread out all over the surface of the filtering layer and simultaneously aligned in the same direction. Then, the flared fiber bundle side was pressed with a tension applied thereto against the surface of a heated metal roller to set the fiber bundles and a filter cloth was thereby made. The filtering performances of filter cloths obtained in this way were evaluated. The evaluations were carried out using a rotary drum type continuous filtering machine having a filter cloth fitted onto a rotating drum with the filtering layer on the inner side and of a mechanism which effects filtering of unfiltered water guided into the drum to the outside as shown in FIG. 3. In the evaluations, lake water whose concentration of suspended solid including fine particles of small particle diameter was approximately 11 mg/liter with an average particle diameter of 7.8 $\mu$m was used as the unfiltered water. The results obtained were as shown in Table 2.

TABLE 1

|  | Fiber Bundle Length L (1) (mm) | Filter Layer Thickness T (2) (mm) | T/L | Projected Area ratio (3) (times) | Rejecting (4) (%) | Water Permeability Coefficient (5) (ml/cm$^2$sec) | Time to Limit Water Perm. Coefficient (6) (hours) |
|---|---|---|---|---|---|---|---|
| Example 1 | 2.5 | 0.3 | 0.12 | 10 | 90.1 | 11.4 | 1840 |
| Example 2 | 3.0 | 1.5 | 0.50 | 45 | 91.5 | 10.3 | 1920 |
| Example 3 | 8.5 | 1.4 | 0.16 | 34 | 93.4 | 8.5 | 1500 |
| Example 4 | 10.5 | 7.0 | 0.67 | 246 | 98.6 | 9.3 | 1600 |
| Example 5 | 19.0 | 2.9 | 0.15 | 278 | 99.7 | 7.5 | 1360 |
| Example 6 | 19.5 | 11.3 | 0.58 | 343 | 99.4 | 7.1 | 1220 |
| Comparative Example 1 | 1.5 | 0.23 | 0.015 | 3 | 75.4 | 3.9 | 400 |
| Comparative Example 2 | 1.5 | 1.2 | 0.8 | 5 | 55.8 | 9.8 | 1520 |
| Comparative Example 3 | 10.8 | 8.1 | 0.75 | 410 | 98.5 | 3.1 | 480 |
| Comparative Example 4 | 25.0 | 0.4 | 0.016 | 34 | 99.7 | 1.6 | 40 |

TABLE 2

|  | Crimped Fiber Ratio (7) (%) | Fiber Bundle Length L (1) (mm) | Filter Layer Thickness T (2) (mm) | T/L | Stopping (4) (%) | Loss Water Head (8) (cm) |
|---|---|---|---|---|---|---|
| Example 7 | 5.5 | 2.4 | 0.3 | 0.13 | 71 | 13.3 |
| Example 8 | 11.3 | 2.4 | 1.1 | 0.46 | 74 | 10.4 |
| Example 9 | 16.2 | 5.5 | 0.8 | 0.15 | 91 | 14.3 |
| Example 10 | 16.5 | 18.2 | 6.4 | 0.35 | 87 | 15.8 |
| Example 11 | 25.6 | 8.0 | 1.6 | 0.20 | 93 | 15.2 |
| Example 12 | 55.7 | 5.1 | 1.4 | 0.27 | 90 | 14.0 |
| Example 13 | 89.4 | 5.3 | 1.0 | 0.19 | 81 | 12.8 |
| Example 14 | 94.6 | 5.2 | 1.2 | 0.23 | 72 | 12.1 |
| Comparative Example 5 | 0.0 | 2.5 | 0.04 | 0.015 | 58 | 23.7 |
| Comparative Example 6 | 1.3 | 2.5 | 1.9 | 0.76 | 39 | 10.5 |
| Comparative Example 7 | 0.0 | 5.5 | 0.09 | 0.016 | 72 | 25.1 |

From this it can be seen that in the filter cloths of Examples 7 to 14 of the invention the rejection of suspended solid in the unfiltered water is high and the loss water head is also at a low level, and a balance of rejection and water permeability has been achieved. In Comparative examples 5 to 7, on the other hand, wherein fiber bundles having low crimped fiber ratios were used for the filtering layer, in those with which the rejection was high the loss water head was also high and in those with which the loss water head was low the rejection was also low, and in no case was a balance between rejection and water permeability obtained.

Definitions of the Parameters (1) Fiber Bundle Length

The average value of the length of the constituent fibers from the upper end surface of the base layer (when the base layer is a woven fabric and the surface has ridges, the upper ends of the ridges) to the free ends of the fiber bundles of the filtering layer. When the fiber bundles form loops, it is defined as the average length of the fiber bundle fibers above the upper end surface of the base layer.

(2) Filtering Layer Thickness

Nine approximately 3 cm×3 cm test pieces are collected, and three of these are stacked and placed on the pressuring table of a compressive elasticity tester. A 2 cm$^2$ probe is placed on the test pieces with a load of 6 g and the thickness after ten seconds is measured. The average value of three measurements is obtained and divided by three to calculate the thickness $T_1$ of one piece. Then, for samples of base layer made by removing the fiber bundles of the filtering layer from a filter cloth, the thickness $T_2$ of one piece is calculated by the same method as that in which $T_1$ was obtained. The thickness T of the filtering layer is obtained from the equation $T=T_1-T_2$ (mm).

(3) Projected Area Ratio

As shown in the equation below, the projected area ratio can be defined as the value obtained by multiplying together the average value (D) of the diameter (in the case of a modified cross-section fiber, the major axis) of the fibers of the filtering layer, the length (L) obtained as described in (1) above and the number (N) of the fiber bundle fibers of the filtering layer per unit area of the filter cloth and dividing the product obtained by the unit area (S).

$$\text{projected area ratio} = D \times L \times N \div S$$

(4) Rejection

When the suspended solid concentrations of the unfiltered water and the filtered water are respectively $C_1$ and $C_2$, the rejection R is obtained from the equation $R=(C_1-C_2)\div C_1 \times 100$. The suspended solid concentrations are measured based on JIS K0102.

(5) Water Permeability Coefficient

Figure 1:
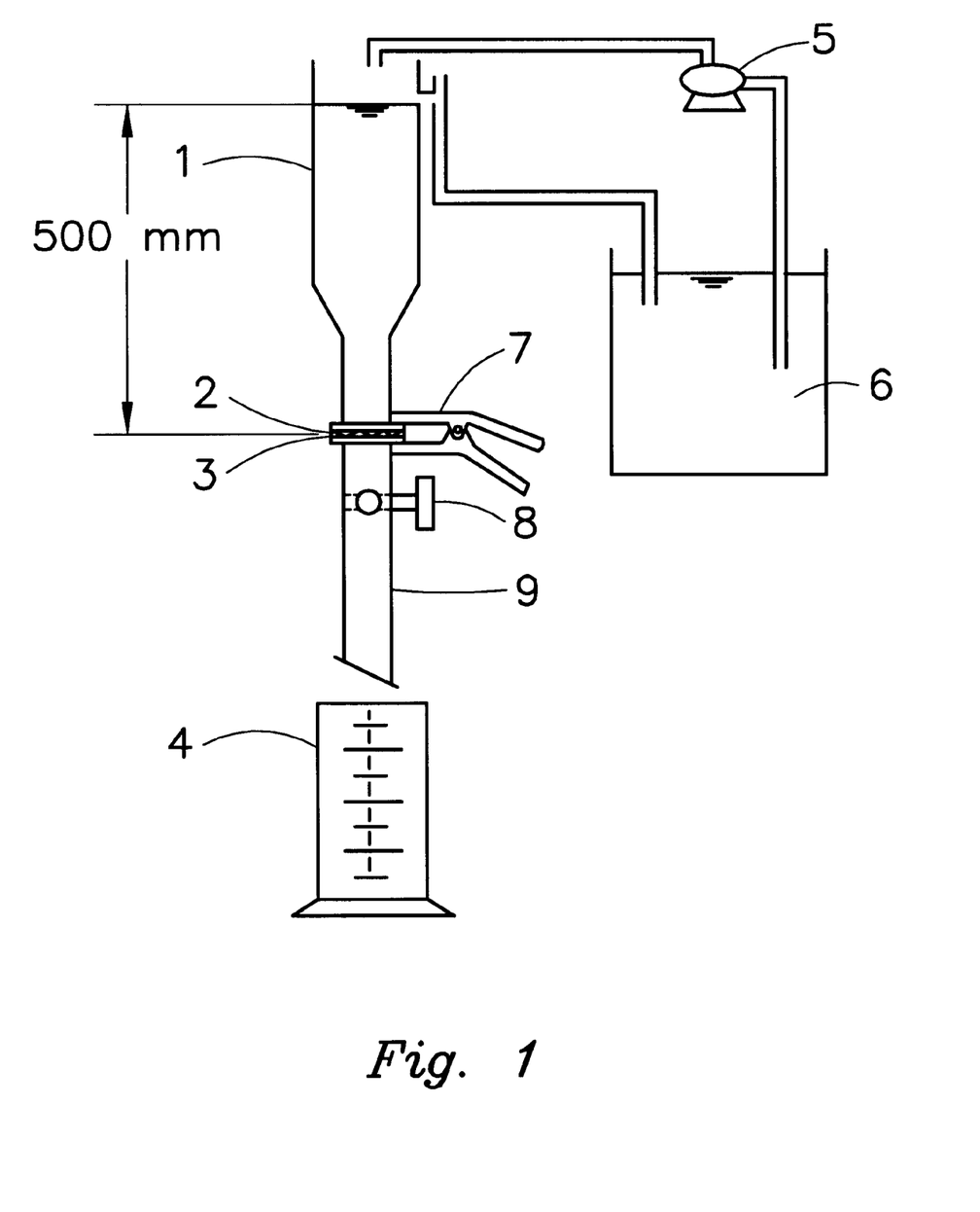
FIG. 1 is a side view of an apparatus for measuring the water permeability coefficient of a filter cloth.

The apparatus shown in FIG. 1 is used. A new sample is wetted by immersion in distilled water for twenty-four hours before the measurement. The filter cloth is placed on a wire gauze mesh on the top of a lower filtering pipe and this is fixed to an upper filtering pipe with a clamp. Distilled water is filled into the upper filtering pipe and while a water head height of 500 mm is maintained a cock is opened and 1 to 1.5 liters of filtered water are collected. The time for which the cock is fully open is simultaneously measured, and the water permeability coefficient K is obtained by the following equation:

$$K=W\div(9.6\times S) \text{ (ml/cm2.sec)},$$

where W is the filtered water collected (ml), S is the time for which the cock is fully open (seconds) and 9.6 is the filtering area of the filter cloth (cm$^2$). The initial water permeability coefficients shown in Table 1 are water permeability coefficient values of new samples tested before unfiltered water was passed through them.

(6) A water permeability coefficient of 1 ml/cm$^2$.sec is selected as a limit water permeability coefficient. Carrying out filtering of unfiltered water causes the permeability performance to gradually fall, and the water permeability coefficient of the filter cloth soon falls to this limit water permeability coefficient; the longer the time over which filtering is carried out until the water permeability coefficient reaches this limit water permeability coefficient (the time to limit water permeability coefficient) is, the better the filter cloth is.

(7) Crimped Fiber Ratio

Measuring is carried out by the following procedure:

A. Fiber bundle fibers of the filtering layer are cut off and dispersed in water at 20° C. in such a way that fibers do not become entangled with each other.

B. The liquid with fibers dispersed therein is dripped onto a slide glass and pressed from above with a cover glass to sandwich the fibers and disperse them in a flat plane.

C. A photograph of this is taken with a microscope from directly above. The magnification is made 30 to 150 times, whereby the work described below under D. is easy to perform, and changed according to the thickness of the fibers.

Figure 4:
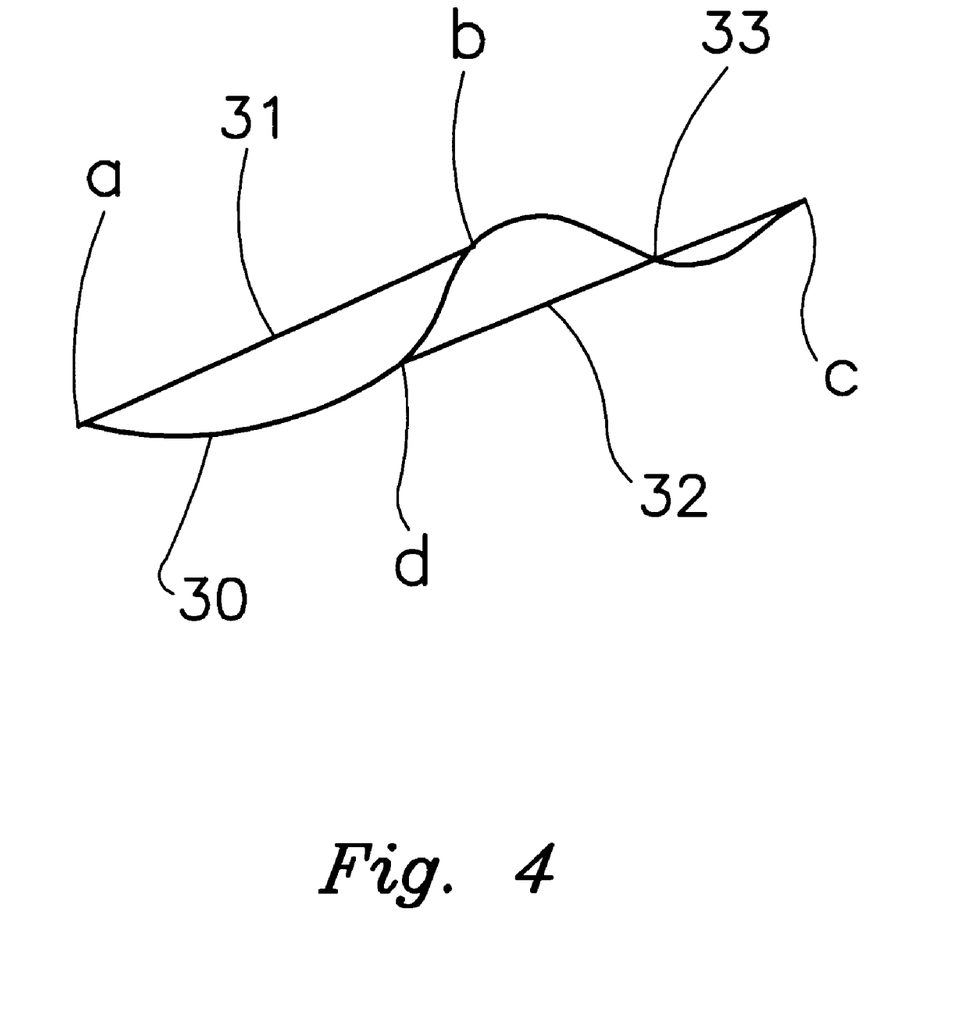
FIG. 4 is a view illustrating how a crimped fiber ratio is obtained.

D. A model view of a microscope photograph is shown in FIG. 4. The fiber diameter is defined as R and a point on the fiber centerline corresponding to a straight line distance of 200 times R from the center point a of one end of the fiber is defined as b. Point a and point b are connected by a straight line. When the straight line ab and the centerline of the fiber cross or touch at a point other than point a and point b, the fiber is counted as a crimped fiber. When the straight line ab and the fiber do not cross or touch at any point other than point a and point b, the fiber is not counted as a crimped fiber. The same procedure is carried out with respect to the center point c of the other end of the same fiber, and the point on the fiber centerline at a straight line distance of 200 times R from c is defined as d. When the straight line cd and the centerline of the fiber cross or touch at a point other than point c or point d, the fiber is counted as a crimped fiber again. When the straight line cd and the fiber do not cross or touch at any point other than point c or point d, the fiber is not counted as a crimped fiber again. When the fiber is completely straight over the range of the straight line distance of 200 times R, the straight line ab or the straight line cd and the centerline of the fiber are mutually superposed and touch at all points, but in this case the fiber is not counted as a crimped fiber. Only cases wherein the centerline of the fiber once leaves the straight line ab or the straight line cd and then crosses or touches it again is the fiber counted as a crimped fiber.

E. The determination described above in D is carried out for 100 fibers and the crimped fiber ratio is obtained using the following equation:

crimped fiber ratio=crimped fiber count÷200×100 (%)

(8) Loss Water Head

The difference between the water level of the unfiltered water inside the rotary drum and the water level of the filtered water is taken as the loss water head.

(9) Percentage Crimp

This is measured by the following procedure:

A. Under standard conditions, a hank of circumferential length 40 cm, number of turns 10 is made out of the thread being measured using a hank winder.

B. The hank is hung on a hook and put into a transparent container containing water at 20° C.

C. For each of twenty doubled threads, an initial load of 0.002 gf per 1 denier is applied to the hank and after two minutes the length $L_0$ of the doubled hank is measured in the water.

D. Next, in addition to the initial load, a fixed load of 0.1 gf is applied to the hank and the length $L_1$ of the doubled hank after two minutes is measured.

E. The percentage crimp is obtained using the following equation:

percentage crimp=$(L_1-L_0)\div L_1 \times 100$ (%)

Industrial Applicability

With this invention, by adopting the kind of construction described above, it is possible to obtain a filter cloth having excellent fine particle collecting performance and washing recovery performance and having high durability and superior dimension stability. In addition, according to another construction of the invention, it is possible to obtain a new filter cloth having excellent fine particle collecting performance, resistance to fouling and durability and also having superior water permeability which can be preferably used for separating out suspended solid. In particular, even fine particles of particle diameter below 20 to 30 $\mu$m, which with conventional filter cloths it has been difficult to deal with, processing with a filter cloth of the invention is possible, and even minute particles of from submicrons to less than a few $\mu$m can be coped with satisfactorily. The types of fine particles are not limited in any way, but because the invention is particularly suitable for separating fine particles having irregularities in their surfaces like plankton, it can be preferably used in applications such as removal of microorganisms from elevated water tanks and cooling towers, purification or pre-treatment of industrial water or drinking water, separation of coagulated matter in waste water treatment and plankton separation of reservoirs and lakes and marshes.

What is claimed is:

1. A filter cloth for solid-liquid separation comprising at least a base layer and a filtering layer comprising fiber bundles of crimped fiber, said crimped fiber being present in a ratio between about 5% and about 95%, wherein said fiber has a denier of 0.001 to 1, and wherein said filtering layer has a ratio T/L of the thickness (T) of the filtering layer to the length (L) of fibers of fiber bundles constituting the filtering layer, of 0.02 to 0.7, and wherein the sum of a projected area of said fibers onto said base layer surface is 8 to 350 times the area of the base layer surface.

2. A filter cloth for solid-liquid separation according to claim 1 characterized in that the ratio T/L of the thickness (T) of the filtering layer to the length (L) of fibers of the fiber bundles constituting the filtering layer is 0.02 to 0.7.

3. A filter cloth for solid-liquid separation according to claim 1 characterized in that the sum of the projected area onto the base layer surface of the fibers of the fiber bundles constituting the filter layer is 8 to 350 times the area of the base layer surface.

4. A filter cloth for solid-liquid separation according to claim 1 characterized in that elongations in the lengthwise direction and the widthwise direction are 10% or less.

5. A filter cloth for solid-liquid separation according to claim 1 characterized in that an end and/or a middle portion of the fiber bundle is integrated with the base layer.

6. A filter cloth for solid-liquid separation according to claim 5 characterized in that at least one end of the fiber bundle is a free end.

7. A filter cloth for solid-liquid separation according to claim 1 characterized in that the fibers of the fiber bundle are opened and bent in a specific direction.

8. A filter cloth for solid-liquid separation according to claim 1 characterized in that the apparent density of the filter cloth for solid-liquid separation is 0.15 to 0.6 gf/cm$^3$.

9. A filter cloth for solid-liquid separation according to claim 1 characterized in that the density of fiber bundles at the base layer surface is 40 to 900 stumps/cm$^2$.

10. A filter cloth for solid-liquid separation according to claim 1 characterized in that the length of the fibers of the filtering layer is 2 mm to 20 mm.

11. A filter cloth for solid-liquid separation according to claim 1 characterized in that the structure of the base layer is a woven fabric.

12. A filter cloth for solid liquid separation according to claim 11 characterized in that the fiber bundles constituting the filtering layer are intertwined at root portions thereof with a weft and/or a warp of the base layer in at least three places.

13. A belt type solid-liquid separating machine characterized in that separation of suspended solid in unfiltered water is carried out by transporting a belt in which a filter cloth for solid-liquid separation according to claim 1 is used.

14. A belt type solid-liquid separating machine characterized in being constituted with at least a mechanism in which a belt comprising a filter cloth for solid-liquid separation according to claim 1 is provided on a plurality of rollers and moved therearound, a mechanism for supplying unfiltered water onto the inclined belt, a mechanism for sucking supplied unfiltered water from the rear surface of the belt, a mechanism for dewatering a cake formed on the belt by pressurizing the same, a mechanism for peeling off the dewatered cake and a mechanism for washing the belt.

15. A belt type solid-liquid separating machine according to claim 13 comprising a mechanism for detecting the position of a side of the belt and correcting meandering of the belt.

16. A belt type solid-liquid separating machine according to claim 14 characterized in comprising a mechanism for detecting a pressure drop due to sucking from the rear surface of the belt, a mechanism for starting or intensifying washing of a filter cloth for solid-liquid separation when the pressure drop exceeds a set value and a mechanism for stopping washing of the filter cloth for solid-liquid separation or returning to a normal condition after a fixed time has elapsed since washing of the filter cloth for solid-liquid separation was started or intensified.

17. A filter cloth for solid-liquid separation defined in claim 1 characterized in being constituted with at least a base layer and a filtering layer, characterized in that the ratio T/L of a thickness (T) of the filtering layer to the length (L) of fibers of fiber bundles constituting the filtering layer is 0.02 to 0.7 and the sum of a projected area of the fibers onto the base layer surface is 10 to 250 times the area of the base layer surface.

18. A filtering filtering machine characterized in that a filter cloth for solid-liquid separation according to claim 1 is provided around a rotating drum or a flat plate and separation of suspended solid in unfiltered water is carried out.

19. A filtering machine according to claim 18 characterized in being constituted with at least a mechanism partitioning an inside and an outside portion by providing a filter cloth for solid-liquid separation around a drum or a disc-like structural member, a mechanism for passing the unfiltered water through the filter cloth for solid-liquid separation by supplying unfiltered water to the partitioned outside or inside portion, a mechanism for washing the filter cloth for solid-liquid separation from the unfiltered water supply side and/or the other side of the filter cloth for solid-liquid separation and a mechanism for discharging concentrated water produced by the washing.

20. A filter cloth according to claim 4 for solid-liquid separation according to claim 1 characterized in being constituted with at least a base layer and a filtering layer mainly composed of fiber bundles of crimped fiber ratio over 10%.

21. A filtering machine according to claim 19 characterized in that the drum or disc-like structural member is rotatable.

22. A filtering machine according to claim 19 characterized in that the washing is a washing using a spray.

23. A filtering machine according to claim 19 characterized in that the washing of the filter cloth for solid-liquid separation is effected by causing a pressurized liquid to flow in the opposite direction to the flow of the unfiltered water.

24. A filtering machine according to claim 19 characterized in that the unfiltered water supply side is sealed except for an unfiltered water supply opening and there is provided a mechanism which can pressurize the unfiltered water to a pressure greater than the passing resistance of the unfiltered water with respect to the filter cloth for solid-liquid separation.

25. A filtering machine according to claim 19 characterizing in comprising a mechanism for detecting the passing resistance of the unfiltered water with respect to the filter cloth for solid-liquid separation, a mechanism for starting or intensifying washing of the filter cloth for solid-liquid separation when passing resistance exceeds a set value; and a mechanism for stopping the washing of the filter cloth for solid-liquid separation or returning to a normal condition after a fixed time has elapsed since washing or intensifying of washing of the filter cloth for solid-liquid separation was started.

26. A filtering machine according to claim 24 characterized in that in the unfiltered water supply side there is provided a concentrated water discharge opening in addition to the unfiltered water supply opening.

27. A filtering machine according to claim 19 characterized in comprising a mechanism for detecting the passing resistance of the unfiltered water with respect to the filter cloth for solid-liquid separation, a mechanism for starting or intensifying washing of the filter cloth for solid-liquid separation when the passing resistance exceeds an upper set value; and a mechanism for stopping the washing of filter cloth for solid-liquid separation or returning to a normal condition when the passing resistance falls below a lower set value.

28. A belt type solid-liquid separating machine characterized in being constituted with at least a mechanism in which a belt comprising a filter cloth for solid-liquid separation is provided around a plurality of rollers and is moved therearound, wherein said belt comprises a filter cloth for solid-liquid separation comprising at least a base layer and a filtering layer comprising fiber bundles of crimped fiber, said crimped fiber being present in a ratio between about 5% and about 95%, wherein said fiber has a denier of 0.001 to 1, and wherein said filtering layer has a ratio T/L of the thickness (T) of the filtering layer to the length (L) of fibers of fiber bundles constituting the filtering layer, of 0.02 to 0.7, and wherein the sum of a projected area of said fibers onto said base layer surface is 8 to 350 times the area of the base layer surface, a mechanism for detecting the position of a side of the belt and correcting meandering of the belt, a mechanism for supplying unfiltered water onto the inclined belt, a mechanism for sucking supplied unfiltered water from a rear surface of the belt, a mechanism for dewatering a cake formed on the belt by pressurizing the same, a mechanism for peeling off the dewatered cake; and a mechanism for washing the belt, a mechanism for detecting a pressure drop due to sucking from the rear surface of the belt, a mechanism for starting or intensifying washing of the belt when the pressure drop exceeds a set value; and, a mechanism for stopping washing of the belt or returning to normal condition after a fixed time has elapsed since washing of the belt was started or strengthened.

29. A filtering machine according to claim 28 characterized in comprising a mechanism for detecting a pressure drop due to sucking from the rear surface of the belt, a mechanism for starting or intensifying washing of the belt when the pressure drop exceeds an upper set value and, a mechanism for stopping washing of the belt or returning to normal condition when the pressure drop falls below a lower set value.

30. A filtering machine according to claim 28 characterized in that the washing is washing the belt from the unfiltered water supply side using a spray.

31. A filtering machine according to claim 19 characterized in further comprising a mechanism for detecting the passing resistance of the unfiltered water with respect to the filter cloth, a mechanism for starting or intensifying washing of the filter cloth when the passing resistance exceeds a set value and a mechanism for stopping the washing of the filter cloth or returning to a normal condition after a fixed time has elapsed since washing or the intensifying of washing of the filter cloth was started.

32. A filtering machine according to claim 19 characterized in further comprising a mechanism for detecting the passing resistance of the unfiltered water with respect to the filter cloth, a mechanism for starting or intensifying washing of the filter cloth when the passing resistance exceeds an upper set value and a mechanism for stopping the washing of the filter cloth or returning to a normal condition when the passing resistance falls below a lower set value.

33. A belt type solid-liquid separating machine according to claim 28 characterized in that, the intensification of washing is increasing the pressure of spray washing.

34. A filtering machine according to claim 34 characterized in that, the normal condition washing is washing the belt using a spray from the unfiltered water supply side of the belt and the intensifying of washing is washing the belt using a spray from the permeate side of the belt.

35. A belt type solid-liquid separating filtering machine according to claim 28 characterized in that the normal condition washing is washing the filter cloth for solid-liquid separation from the permeate side using a spray and the intensifying of washing is washing the filter cloth for solid-liquid separation from the unfiltered water supply side of the filter cloth for solid-liquid separation using a spray.

36. A filter cloth for solid-liquid separation according to claim 1, wherein said fiber bundles are provided in at least two types, between which there is a difference in crimped fiber ratio of at least 10%.

37. A filter cloth for solid-liquid separation according to claim 1, wherein at least one of said fiber bundles flares from a root portion toward an end portion.

38. A filter cloth for solid-liquid separation according to claim 1, wherein a denier of at least one fiber in said fiber bundles is about 0.001 to about 2.

39. A filter cloth for solid-liquid separation according to claim 1, wherein a denier of at least one fiber bundle is about 50 to about 1,500.

40. A filter cloth for solid-liquid separation according to claim 10, wherein at least one stump includes about 50 to about 15,000 fibers.

41. A filter cloth for solid-liquid separation according to claim 1, wherein said base layer comprises a fiber having an initial tensile modulus greater than about 250 kgf/mm$^2$.

42. A filter cloth for solid-liquid separation according to claim 1, further comprising a water permeability coefficient greater than about 1 ml/cm$^2$ sec.

43. A filter cloth for solid-liquid separation according to claim 1, wherein a percentage crimp of said fiber bundles is between about 2 and about 45.

44. A filter cloth for solid-liquid separation as defined in claim 1 wherein the crimped fiber ratio is 10%–95%.

45. A filter cloth for solid-liquid separation as defined in claim 1 wherein the crimped fiber ratio is 15%–90%.

* * * * *

UNITED STATES PATENT AND TRADEMARK OFFICE
CERTIFICATE OF CORRECTION

PATENT NO. : 6,241,879 B1
DATED : June 5, 2001
INVENTOR(S) : Kato et al.

It is certified that error appears in the above-identified patent and that said Letters Patent is hereby corrected as shown below:

Column 18,
Line 4, the second instance of "filtering" should be deleted.
Line 20, the phrase "according to claim 4" should be deleted.

Column 19,
Lines 41, 42, 44 and 46, in each case, after "filter cloth", please insert -- for solid-liquid separation --.
Line 50, in each case, after "filter cloth", please insert -- for solid-liquid separation --.

Column 20,
Line 3, in each case, after "filter cloth", please insert -- for solid-liquid separation --.
Line 8, "34" should be deleted and replaced with -- 32 --.
Line 34, "10" should be deleted and replaced with -- 9 --.

Signed and Sealed this

Twentieth Day of August, 2002

*Attest:*

*Attesting Officer*

JAMES E. ROGAN
*Director of the United States Patent and Trademark Office*